United States Patent
Jarrett et al.

(10) Patent No.: US 6,194,355 B1
(45) Date of Patent: Feb. 27, 2001

(54) USE OF ALKOXYLATED SURFACTANTS AND ALUMINUM CHLOROHYDRATE TO IMPROVE BRINE-BASED DRILLING FLUIDS

(75) Inventors: Michael A. Jarrett, Houston; Harold R. Krause, Tomball; John C. Welch, Spring; Allen Gabrysch; Patricia Potts, both of Houston, all of TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 09/248,310

(22) Filed: Feb. 9, 1999

(51) Int. Cl.$^7$ ....................................... C09K 7/02
(52) U.S. Cl. .................. 507/140; 507/117; 507/118; 507/120; 507/121; 507/136; 507/145
(58) Field of Search ..................... 507/140, 120, 507/121, 117, 118, 136, 269, 145, 277

(56) References Cited

U.S. PATENT DOCUMENTS

| | | |
|---|---|---|
| 3,954,627 | 5/1976 | Dreher et al. . |
| 4,008,766 | 2/1977 | Savins . |
| 4,021,356 | 5/1977 | Kudchadker et al. ........... 252/8.55 D |
| 4,468,334 | 8/1984 | Cox, et al. ......................... 252/8.5 C |
| 4,540,496 * | 9/1985 | Peiffer et al. ......................... 507/120 |
| 4,541,485 | 9/1985 | Block .................................. 166/281 |
| 4,635,727 * | 1/1987 | Anderson et al. .................... 507/269 |
| 4,637,882 * | 1/1987 | Peiffer et al. ......................... 507/120 |
| 4,646,834 | 3/1987 | Bannister ............................. 166/291 |
| 5,232,621 | 8/1993 | Dixit et al. ....................... 252/174.23 |
| 5,576,271 | 11/1996 | Patel ..................................... 507/110 |
| 5,654,261 * | 8/1997 | Smith .................................... 507/140 |
| 5,799,734 | 9/1998 | Norman et al. ....................... 166/278 |
| 5,964,295 | 10/1999 | Brown et al. . |

OTHER PUBLICATIONS

W.L. Nehmer, "Viscoelastic Gravel–Pack Carrier Fluid;" SPE Formation Damage Control Symposium, Feb. 8–9, 1988, pp. 217–220.

Albright & Wilson, "Novel Water Based Drilling Fluids Using Structured Liquid Technology," Apr. 27, 1992.

B.R. Stewart, et al., "Use of a Solids–free Viscous Carrying Fluid in Fracturing Applications: An Economic and Productivity Comparison in Shallow Completions," European Formation Damage Control Conference, May 15–16, 1995, pp. 379–385.

J.L. Elbel, et al., "Production Effects of Fluid Loss in Fracturing High–Permeability Formations," European Formation Damage Control Conference, May 15–16, 1995, pp. 201–207.

* cited by examiner

Primary Examiner—Philip Tucker
(74) Attorney, Agent, or Firm—Madan, Mossman & Sriram, P.C.

(57) ABSTRACT

A drilling fluid having a brine base fluid, aluminum chlorohydrate as a viscosifying agent, an alkoxylated surfactant, and an amphoteric polymer encapsulant has been found to have excellent viscoelasticity and suspension characteristics. Surprisingly, it has been discovered that a synergistic effect is present between the aluminum chlorohydrate and the surfactant such that less of each component is required when both are used together to suspend the same amount of solids, than if one or the other is used separately.

7 Claims, No Drawings

USE OF ALKOXYLATED SURFACTANTS AND ALUMINUM CHLOROHYDRATE TO IMPROVE BRINE-BASED DRILLING FLUIDS

FIELD OF THE INVENTION

The present invention relates to brine-based drilling fluids used during petroleum recovery operations, and more particularly relates, in one embodiment, to using the use of aluminum chlorohydrate and alkoxylated surfactants in brine-based drilling fluids.

BACKGROUND OF THE INVENTION

Drilling fluids used in the drilling of subterranean oil and gas wells as well as other drilling fluid applications and drilling procedures are known. In rotary drilling there are a variety of functions and characteristics that are expected of drilling fluids, also known as drilling muds, or simply "muds". The drilling fluid is expected to carry cuttings up from beneath the bit, transport them up the annulus, and allow their separation at the surface while at the same time the rotary bit is cooled and cleaned. A drilling mud is also intended to reduce friction between the drill string and the sides of the hole while maintaining the stability of uncased sections of the borehole. The drilling fluid is formulated to prevent unwanted influxes of formation fluids from permeable rocks penetrated and also often to form a thin, low permeability filter cake which temporarily seals pores, other openings and formations penetrated by the bit. The drilling fluid may also be used to collect and interpret information available from drill cuttings, cores and electrical logs. It will be appreciated that within the scope of the claimed invention herein, the term "drilling fluid" also encompasses "drill-in fluids".

Drilling fluids are typically classified according to their base material. In water-based muds, solid particles are suspended in water or brine. Oil can be emulsified in the water. Nonetheless, the water is the continuous phase. Oil-based muds are the opposite. Solid particles are suspended in oil and water or brine is emulsified in the oil and therefore the oil is the continuous phase. Oil-based muds which are water-in-oil emulsions are also called invert emulsions. Brine-based drilling fluids, of course are a water-based mud in which the aqueous component is brine.

Polymers have been used in the past as viscosifiers in drilling fluids to carry or suspend cuttings, weighting agents and other solids in the brine-baseddrilling fluids. However, in the particularly harsh brine-based drilling fluidspresently in use, conventional polymers, such as PHPA, and other components undesirably precipitate out.

It is apparent to those selecting or using a drilling fluid for oil and/or gas exploration that an essential component of a selected fluid is that it be properly balanced to achieve all of the necessary characteristics for the specific end application. Because the drilling fluids are called upon to do a number of tasks simultaneously, this desirable balance is not always easy to achieve.

It would be desirable if compositions and methods could be devised to aid and improve the ability of drilling fluids to simultaneously accomplish these tasks.

SUMMARY OF THE INVENTION

Accordingly, it is an object of the present invention to provide methods to give good viscoelasticity and suspension characteristics to harsh brine-based drilling fluids.

It is another object of the present invention to provide stable, viscoelastic brine-based drilling fluids.

Still another object of the invention is to provide a composition and method which give viscoelastic brine-based drilling fluids having the necessary gel strength for carrying solids.

In carrying out these and other objects of the invention, there is provided, in one form, a drilling fluid having from about 0.1 to 15 volume % of aluminum chlorohydrate as a viscosifying agent, from about 0.1 to 6 volume % of an alkoxylated surfactant, from about 0.1 to 6 lb/bbl (0.286–17.2 g/l) of an amphoteric polymer encapsulant, and a brine base fluid making up the balance, where the proportions are based on the brine base fluid.

DETAILED DESCRIPTION OF THE INVENTION

The invention provides a method of improving viscoelastic properties of a brine-based drilling fluid (which also includes drill-in fluids) by incorporating an alkoxylated surfactant and aluminum chlorohydrate. Incorporating both additives yields synergistic benefits in imparting a good gel structure necessary for solids suspension, such as bridging agents and/or weighting agents. As stand-alone additives, alkoxylated surfactants provide viscoelasticity to high density brines, particularly those based on calcium chloride and/or calcium bromide. However, gel strengths of these fluids tend to be low and flat. Aluminum chlorohydrate has been found to provide high gel strengths in brines; however, high dosage treatments (greater than about 5% by volume) are needed to produce sufficient gels for solids suspension. Also, the gels using aluminum chlorohydrate only tend to be stiff, thus requiring excessive pump energy to induce fluid flow. Another disadvantage when using excessive aluminum chlorohydrate is possible formation damage.

This invention has found that the use of both additives exhibits a synergy for yielding desirable flow properties with the necessary gel structure for solids carrying. Less of each component is required to suspend the same amount of solids, as compared to one or the other used separately. Suggested applications for this technology are for drilling and drill-in fluids, particularly in deep-water operations.

In a preferred embodiment of the invention, a brine-based drilling fluid having good gel strength and suspension characteristics for carrying solid particles, such as bridging agents, weighting agents, cuttings, is made using a brine base fluid, aluminum chlorohydrate as a viscosifying agent, an alkoxylated surfactant, and an amphoteric polymer encapsulant, all in a effective mounts to accomplish their stated purposes. Aluminum chlorohydrate, $[Al_2(OH)_5Cl]_x$, has not previously been known to be useful as a viscosifying agent to help suspend solids in a brine-based drilling fluid. The aluminum chlorohydrate also provides excellent shale stabilization characteristics to the brine-based drilling fluids. In one embodiment of the invention, the aluminum chlorohydrate is present in the total brine-based drilling fluid in a proportion ranging from about 0.1 to about 15 volume %; in another embodiment from about 1 to about 10 volume %; preferably from about 2 to about 8 volume %; and most preferably from about 2.5 to about 5 volume %, all based on the brine base fluid.

The brine base fluid may be any brine, conventional or to be developed which serves as a suitable media for the various concentrate components. As a matter of convenience, the brine base fluid may be the brine available at the site used in the completion fluid, for a non-limiting example. In forming these high density brines, the salts employed include, but are not necessarily limited to calcium chloride, sodium chloride, potassium chloride, magnesium chloride, calcium bromide, sodium bromide, potassium bromide, calcium nitrate, sodium formate, potassium formate, cesium formate and mixtures thereof. It is further anticipated that the drilling fluids of this invention are generally high density drilling fluids, which may be defined has having a density of about 8.4 to 19.4 lb/gal or more ($1.01 \times 10^3$ to $2.30 \times 10^3$ kg/m$^3$).

A surfactant is required to form a stable composition. Additionally, without a surfactant, so much aluminum chlorohydrate would have to be used that the fluid would be expensive, probably corrosive, and have shear thinning properties that may be acceptable, but which may not be as optimum as in the synergistic blend. Surfactants suitable for use in the present invention include, but are not necessarily limited to those having a hydrophilic/lipophilic balance of between about 12–19, preferably a HLB of between about 15–19. Such surfactants include, but are not necessarily limited to, ethoxylated fatty alcohols, such as oleyl alcohol ethoxylate; ethoxylated vegetable oils, such as ethoxylated castor oil; ethoxylated alcohols, such as ethoxylated isotridecyl alcohols; ethoxylated fatty acids; ethylene oxide/propylene oxide block copolymers; and ethoxylated esters, such as polyethylene glycol esters and ethoxylated sorbitol esters. Certain esters, including but not necessarily limited to, sorbitol esters and phosphate esters, are effective without ethoxylation. Preferred surfactants are non-toxic. It is also preferred that the surfactant is an alkoxylated fatty alcohol or alkoxylated vegetable oil. A most preferred surfactant is ethoxylated castor oil. The foregoing surfactants are widely available from a variety of commercial sources.

The surfactant aids the aluminum chlorohydrate to keep the solid particles in suspension in the brine-based drilling fluid. Another characteristic contributed by these surfactants is the phenomenon of coacervation and gel formation in the brine, which has been extensively studied. Although the molecular interactions vary from system to system, coacervation of the surfactants is usually accompanied by a strong adsorption of counterions. The viscoelastic gels represent agglomerations of very long, rod-like micelles which are formed by transformation of the smaller, spherical, lamellar or double layer micelles. A "salting-in" phenomenon occurs with oils in brine salts of Ca, Mg, Al and Li. This effect is due to a coordination of the hydrated metallic cation with the ether oxygen atoms forming crystalline complexes. In one embodiment of the invention, the surfactant is present in the total brine-based drilling fluid in a proportion ranging from about 0.1 to about 6 volume %; in another embodiment from about 1 to about 5 volume %; preferably from about 2 to about 4 volume %, all based on the brine base fluid.

Although brine-based drilling fluid can be formed by using surfactants alone and aluminum chlorohydrate alone, it has been surprisingly discovered that the use of both together can achieve a brine-based drilling fluid with the same solids content, but reduced amounts of both the aluminum chlorohydrate and the surfactant. A viscoelastic fluid results from the presence of these components in effective amounts. In one non-limiting embodiment of the invention, optimum rheological benefits in building a viscoelastic brine-based drilling fluid is achieved when using 1–5% by volume alkoxylated surfactant, 1–5% by volume aluminum chlorohydrate and 0.1–6 lb/bbl (0.286–17.16 g/l), amphoteric polymer encapsulant, preferably 3–6 lb/bbl (8.58–17.16 g/l).

The amphoteric polymer encapsulant may be any suitable compound to encapsulate cuttings, i.e. to maintain integrity of cuttings being pumped out of the hole. Suitable amphoteric polymer encapsulants for use in the compositions and methods of this invention include but are not necessarily limited to, Calgon Experimental 3959-19A, terpolymers of acrylamide, dimethyldiallyl ammonium chloride and acrylic acid, and varying ratios of these on a mole % basis; terpolymers of acrylamide, AMPS, and dimethyldiallyl ammonium chloride, and varying ratios of these on a mole % basis; and copolymers of acrylamide and the sodium salt of sulfonated styrene, and the like, and varying ratios of these on a mole % basis, and mixtures thereof.

Because of the aluminum chemistry of the brine-based drilling fluids of this invention, not all conventional components, such as cellulosic derivatives, are compatible and will precipitate out. Further, gums such as xanthan gum, guar gum, etc. and the like; PHPA (partially hydrolyzed polyacrylamide) and cellulosic derivatives of polyvinyl alcohol also tend to precipitate out of the brines of this invention. In one embodiment of the invention, the method and composition of this invention are practiced in the explicit absence of these materials.

The drilling fluid of this invention may include conventional components, such as proppants, solid particles or gravels, namely any solid particulate matter suitable for its intended purpose, for example as a screen or proppant, etc. Suitable materials include, but are not necessarily limited to sand, sintered bauxite, sized calcium carbonate, sized salts, ceramic beads, and the like, and combinations thereof. The proportion of solid particles in the pumpable viscoelastic brine-based drilling fluids may range from about 1 to about 18 pounds per gallon (120–2,160 kg/m$^3$), preferably from about 15 to about 18 pounds per gallon (1,800–2,160 kg/m$^3$).

One basic, non-limiting method when a proppant is used is to inject the proppant into the drilling fluid downstream from the conventional pumps which are delivering the gravel packing fluid or other fluid to contain solids. To do this, the proppant is suspended in the form of a slurry in the viscosified brine. The proppant is thus delivered by a small injection pump to the carrier fluid at an injection point downstream from the pumps used to transport the gravel packing fluid.

It will be appreciated that the drilling fluids of this invention may contain conventional components in conventional proportions, including, but not necessarily limited to bridging agents, weighting agents, and proppant agents, and the like.

The compositions and methods of this invention are quickly and easily and completely mixed using conventional equipment. That is, the physical form of the viscoelastic brine-based drilling fluid facilitates the handling and metering of the proppant or other solids to be included.

It is anticipated that under some circumstances the viscoelastic brine-based drilling fluid may be desirably broken, that is, to be made no longer as viscoelastic, by a mechanism such as dilution and mixing with another fluid (or more of the same base fluid, e.g. brine). Other mechanisms for breaking the viscoelastic character of the drilling fluid may include, but are not necessarily limited to pH adjustment (shifting pH to acid or base), pressure adjustment, temperature adjustment, catalyst or other added reactive agent, and the like.

The invention will now be further illustrated by the following non-limiting Examples. A goal was to develop a 12.0 lb/gal (1,440 kg/m$^3$) fluid that can be prepared via injection manifold with prompt viscosity and filtration control for riser-less deep water drilling operations. Three fluids prepared in accordance with this invention are set out in Table I.

TABLE I

Brine-Based Drilling Fluids Containing Alkoxylated Surfactants and Aluminum Chlorohdrate

| Materials | Ex. 1 | Ex. 2 | Ex. 3 |
| --- | --- | --- | --- |
| 14.2 lb/gal CaCl$_2$/CaBr$_2$ brine, bbl (1.70 × 10$^3$ kg/m$^3$) | 0.1996 (31.7 l) | 0.1996 (31.7 l) | 0.1996 (31.7 l) |
| 11.6 lb/gal CaCl$_2$/CaBr$_2$ brine, bbl (1.39 × 10$^3$ kg/m$^3$) | 0.7556 (120 l) | 0.7556 (120 l) | 0.7556 (120 l) |
| Fresh water, bbl | 0.0471 | 0.0471 | 0.0471 |
| 4:1 Blend (DFE-309:DFF-705), % by vol. | 5 | 5 | 5 |
| MILSTARCH, lb | 5 | 5 | 5 |
| MILCARB, lb | 10 | 10 | 10 |
| MILBAR, lb (for final density of 13 lb/gal) | — | 72 (32.7 kg) | — |

| Properties | Sheared 30 min., 3500 rpm | Sheared 30 min., 3500 rpm | Sheared 5 min., 9000 rpm |
| --- | --- | --- | --- |
| 600 rpm rdg | 88 | 140 (25°F.) | 107 | 36 |
| 300 rpm rdg | 52 | 82 | 64 | 27 |
| 200 rpm rdg | 38 | 59 | 42 | 20 |
| 100 rpm rdg | 24 | 33 | 23 | 15 |
| 6 rpm rdg | 4 | 5 | 7 | 6 |
| 3 rpm rdg | 3 | 4 | 6 | 4 |
| Plastic Viscosity, cp at 70° F. | 36 | 58 | 43 | 9 |
| Yield Point, lb/100 sq ft (kg/m$^2$) | 16 (0.78) | 24 (1.17) | 21 (1.02) | 18 (0.879) |
| 10-sec Gel, lb/100 sq ft (kg/m$^2$) | 4 (0.195) | 4 (0.195) | 8 (0.391) | 8 (0.391) |
| 10-min. Gel, lb/100 sq ft (kg/m$^2$) | 16 (0.780) | 17 (0.83) | 19 (0.928) | 10 (0.488) |
| API Filtrate, ml | 2.0 | 1.8 | 3.6 | 4.6 |

Physical Measurement Procedures

- Rheological, filtration control and suspension properties
- Mixability

Equipment a. Balance: precision of 0.01 g
b. Thermometer: 32–300 ± 1° F. (or 0–150 ± 0.5° C.)
c. Prince Castle Mixer
d. Roller oven, 150–350 ± 5° F. (or 65–175 ± 0.5° C.)
e. Fann Viscometer, Model 35A
f. 500-ml jars with sealing lids
g. API filtration (100 psi) unit Procedure A 4:1 ratio blend of DFE-705 and DFE-309 was made. To each one-barrel aliquot was added 5% by volume of the blend, along with 1 lb/bbl (2.86 g/l) presolubilized caustic soda. MILSTARCH and MILCARB were added immediately. Shear time was 5 minutes at 9000 rpm on the Prince Castle mixer. Rheological and filtration control properties were immediately measured.

The same formulation was also prepared at lower shear (3500 rpm) for 30 minutes. Initial and final (after 16 hour refrigeration at 30° F.) rheological and filtration control properties were measured. The successful candidate fluid was weighted up to 13 lb/gal (1.56×10$^3$ kg/m$^3$) with MILBAR; final properties were recorded.

The brine-based drilling fluids of Examples 4–8 were prepared and evaluated similarly to the brine-based drilling fluids Examples 1–3; the results are given in Table II.

TABLE II 11.6 lb/gal CaCl$_2$ and 13.5 lb/gal CaCl$_2$/CaBr$_2$ Brine-Based Drilling Fluids

| | Ex. 4 | Ex. 5 | Ex. 6 | Ex. 7 | Ex. 8 |
| --- | --- | --- | --- | --- | --- |
| Materials | | | | | |
| 11.6 lb/gal CaCl$_2$, bbl (1.39 × 10$^3$ kg/m$^3$) | — | 0.96 (153 l) | — | 0.98 (156 l) | — |
| 13.5 lb/gal CaCl$_2$/CaBr$_2$, bbl (1.62 × 10$^3$ kg/m$^3$) | 0.94 (149 l) | — | 0.9575 (152 l) | — | 0.98 (156 l) |
| DFE-705, % by vol. | 3.0 | 1.0 | 0.25 | 2.0 | 2.0 |
| DFE-309, % by vol. | 3.0 | 3.0 | 4.0 | 3.0 | 3.0 |
| Caustic soda, lb (kg) | 1.0 (0.454) | 1.5 (0.680) | 1.5 (0.680) | — | — |
| BIO-PAQ, lb (kg) | 4.0 (1.81) | — | — | — | — |
| BIO-LOSE, lb (kg) | — | 6.0 (2.72) | 6.0 (2.72) | 6.0 (2.72) | 6.0 (2.72) |
| Calgon Experimental 3959-19A, lb (kg) | 6.0 (2.72) | 6.0 (2.72) | 3.0 (1.36) | 6.0 (2.72) | 6.0 (2.72) |
| MILCARB, lb (kg) | 50 22.7 | 50 22.7 | 50 22.7 | 50 22.7 | 50 22.7 |
| Magnesium oxide, lb (kg) | — | — | — | 3.0 (1.36) | 3.0 (1.36) |

Stirred on Prince Castle at 5000 rpm, 45 minutes
Properties

| | | | | | |
| --- | --- | --- | --- | --- | --- |
| 600 rpm rdg at 120° F. | 86 | 86 | 140 | 80 | 113 |
| 300 rpm rdg | 48 | 50 | 80 | 50 | 70 |
| 200 rpm rdg | 35 | 35 | 60 | 38 | 56 |
| 100 rpm rdg | 20 | 20 | 36 | 24 | 38 |
| 6 rpm rdg | 5 | 4 | 10 | 9 | 17 |
| 3 rpm rdg | 4 | 5 | 8 | 8 | 15 |
| Plastic Viscosity, cp at 70° F. | 38 | 36 | 60 | 30 | 43 |
| Yield Point, lb/100 sq ft (kg/m$^2$) | 10 (0.488) | 14 (0.683) | 20 (0.976) | 20 (0.976) | 27 (1.32) |
| 10-sec Gel, lb/100 sq ft (kg/m$^2$) | 7 (0.342) | 4 (0.195) | 12 (0.586) | 12 (0.586) | 16 (0.780) |
| 10-min. Gel, lb/100 sq ft (kg/m$^2$) | 19 (0.928) | 7 (0.342) | 24 (1.17) | 15 (0.732) | 20 (0.976) |
| API Filtrate, ml | 1.5 | 0.1 | 0.1 | 0.4 | 0 |
| HPHT Filtrate, ml at 250° F. | — | — | — | 9.6 | 4.4 |

Table III presents data on shale stability using the inventive composition. Formulation 3 (Example 11) had too little aluminum chlorohydrate to be stable (note 43.4% hydration). The other formulations were sufficiently stable.

TABLE III

Shale Stability Data

| Formulation | 1 | 2 | 3 | 4 |
|---|---|---|---|---|
| Example | 2 | 10 | 11 | 12 |
| Brine, 9.2 lb/gal each, (1.10 × 10³ kg/m³) | 2% KCl/NaCl | 2% KCl/NaCl | 2% KCl/NaCl | CaCl |
| DFE-309, vol. % | 10 | 5 | 2.5 | 5 |
| Hrs aged at 150° F. (66° C.) | 16 | 16 | 16 | 16 |
| Initial Dry Shale Wafer Wt., lb (kg) | 18.96 (8.61) | 4.17 (1.89) | 4.12 (1.87) | 4.19 (1.90) |
| Initial Water Content, % | 5.19 | 5.19 | 5.19 | 5.19 |
| Wet Weight of Wafer, lb. (kg) | 20.19 (9.17) | 4.5 (2.04) | 6.76 (3.07) | 4.53 (2.06) |
| Dry Weight of Wafer, lb. (kg) | 18.15 (8.24) | 3.92 (1.78) | 4.49 (2.04) | 4.08 (1.85) |
| Hardness (0–100) | 85 | 85 | | 39 |
| % Recovery | 101.0 | 99.2 | 114.7 | 102.7 |
| % Hydration | 6.3 | 9.1 | 43.4 | 5.6 |
| Comments | Intact as original | Intact | Flower | Few cracks |

In the foregoing specification, the invention has been described with reference to specific embodiments thereof, and has been demonstrated as effective in providing a pumpable, viscoelastic slurry concentrate which can effectively carry solid particles. However, it will be evident that various modifications and changes can be made thereto without departing from the broader spirit or scope of the invention as set forth in the appended claims. Accordingly, the specification is to be regarded in an illustrative rather than a restrictive sense. For example, specific combinations of brines, surfactants and amphoteric polymer encapsulants with aluminum chlorohydrate falling within the claimed parameters, but not specifically identified or tried in a particular composition to improve the delivery of solids herein, are anticipated to be within the scope of this invention.

| GLOSSARY | |
|---|---|
| BIO-LOSE | Derivatized starch available from Baker Hughes INTEQ. |
| BIO-PAQ | Derivatized starch available from Baker Hughes INTEQ. |
| 3959-19A | Acrylamide/Dimethyldiallyl Ammonium Chloride Copolymer available from Calgon |
| DFE-309 | Aluminum chlorohydrate. |
| DFE-705 | Ethoxylated castor oil. |
| MILBAR | Barite weighting agent available from Baker Hughes INTEQ. |
| MILCARB | Calcium carbonate bridging agent available from Baker Hughes INTEQ. |
| MILSTARCH | Derivatized starch available from Baker Hughes INTEQ. |

We claim:

1. A drilling fluid comprising:
   from about 0. to 15 volume % of aluminum chlorohydrate as a viscosifying agent;
   from about 0.1 to 6 volume % of an alkoxylated surfactant;
   from about 0.1 to 6 lb/bbl (0.286 to 17.2 g/l) of polymer encapsulant selected from the group consisting of amphoteric polymers and copolymers of acrylamide and the sodium salt of sulfonated styrene; and
   a brine base fluid making up the balance,
   where the proportions are based on the brine base fluid.

2. The drilling fluid of claim 1 where the alkoxylated surfactant is selected from the group consisting of alkoxylated fatty alcohols and alkoxylated vegetable oils.

3. The drilling fluid of claim 1 where the amphoteric polymer is selected from the group consisting of terpolymers of acrylamide, dimethyldiallyl ammonium chloride and acrylic acid; and terpolymers of acrylamide, AMPS, and dimethyldiallyl ammonium chloride.

4. A method of drilling a well comprising:
   drilling the well with a brine-based drilling fluid;
   injecting into the brine-based drilling fluid:
      from about 0.1 to 15 volume % of aluminum chlorohydrate as a viscosifying agent;
      from about 0.1 to 6 volume % of an alkoxylated surfactant; and
      from about 0.1 to 6 lb/bbl (0.286 to 17.2 g/l) of a polymer encapsulant selected from the group consisting of amphoteric polymers and copolymers of acrylamide and the sodium salt of sulfonated styrene;
      where the proportions are based on the brine base fluid; and
   circulating the drilling fluid while drilling the well within a bore hole in contact with a drill bit and an underground formation.

5. The method of claim 4 where in the injecting, the alkoxylated surfactant is selected from the group consisting of alkoxylated fatty alcohols and alkoxylated vegetable oils.

6. The method of claim 4 where in the injecting, the amphoteric polymer is selected from the group consisting of terpolymers of acrylamide, dimethyldiallyl ammonium chloride and acrylic acid; and terpolymers of acrylamide, AMPS, and dimethyldiallyl ammonium chloride.

7. The method of claim 4 where the brine-based drilling fluid has a viscoelastic property, and where the method further comprises
   breaking the viscoelastic property of the fluid by a mechanism selected from the group consisting of dilution, pH adjustment, pressure adjustment, temperature adjustment, catalytic agent and reactive agent.

* * * * *